Figure 1:
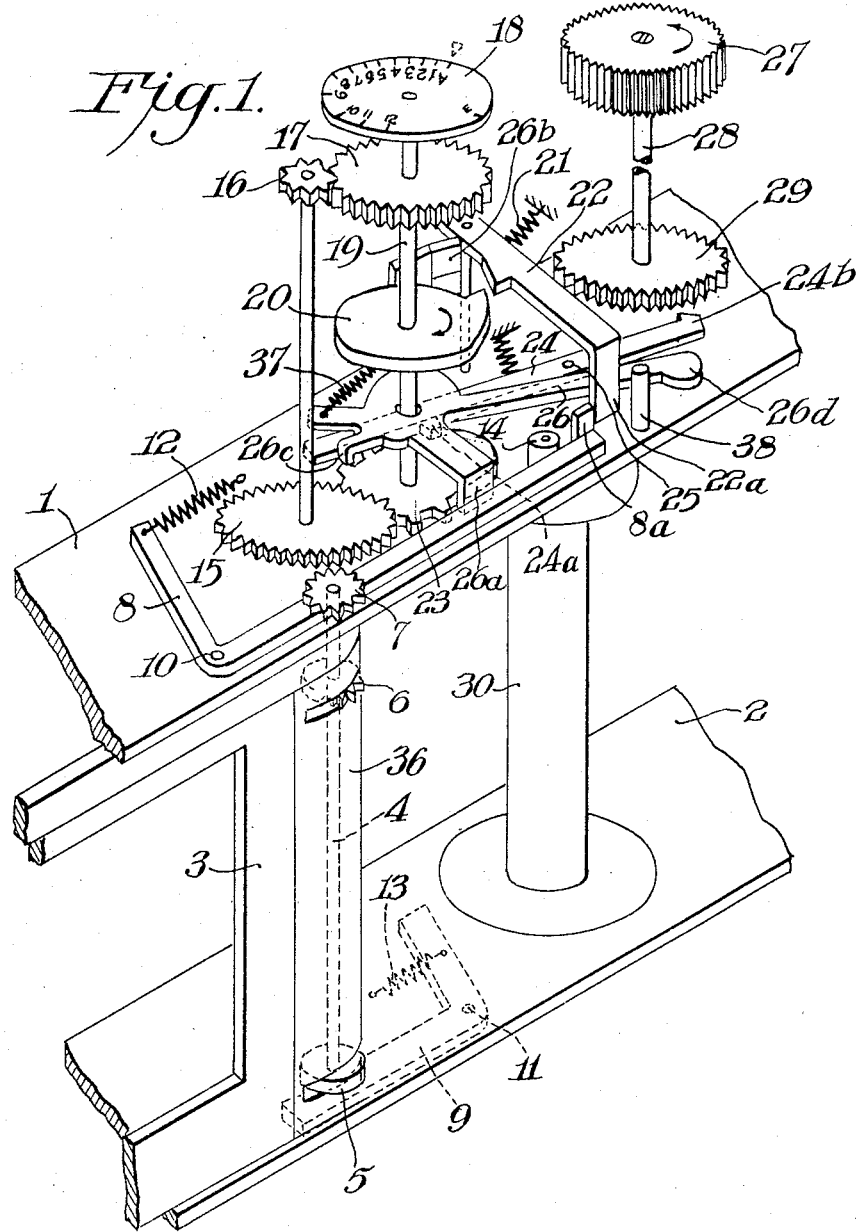

INVENTORS
ALFRED WINKLER
WILLY KADEN
BY Connolly and Hutz
ATTORNEYS

March 31, 1959  A. WINKLER ET AL  2,879,704
ROLL-FILM PHOTOGRAPHIC CAMERAS
Filed Dec. 16, 1954  2 Sheets-Sheet 2
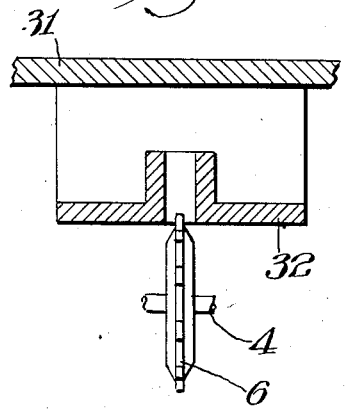
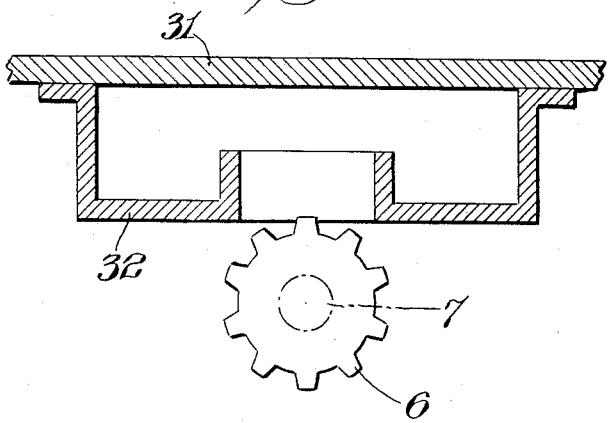
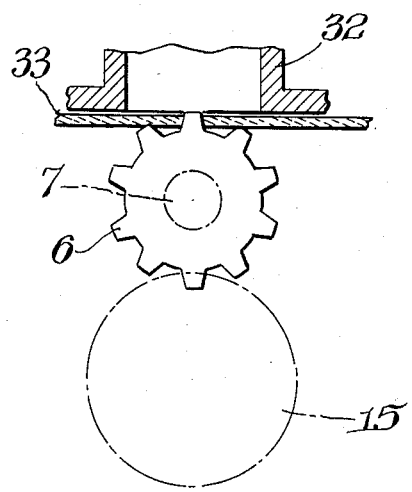
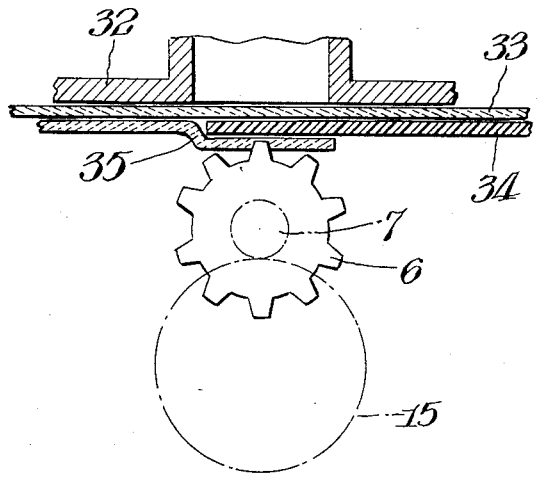
INVENTORS
ALFRED WINKLER
WILLY KADEN
BY Connolly and Hutz
ATTORNEYS

United States Patent Office 2,879,704
Patented Mar. 31, 1959

2,879,704

ROLL-FILM PHOTOGRAPHIC CAMERAS

Alfred Winkler and Willy Kaden, Munich, Germany, assignors to Agfa Aktiengesellschaft, a corporation of Germany Application December 16, 1954, Serial No. 475,644

Claims priority, application Germany January 11, 1954

16 Claims. (Cl. 95—31)

The present invention relates to a roll film camera incorporating an improved device which enables the film to be prepared for exposure after it has been inserted in the camera and the camera has been closed, without having to observe any markings, and also to be advanced after each frame has been exposed, likewise without such observation.

Such devices are already known. Some of them require feeler marks to be provided on the film. It is further known to make use of the different thicknesses of the backing paper and of the film strip in an automatic film advancing means, more especially at the place where the film is attached to the paper. It also is known to utilize the difference in pliability between the backing paper and the film strip in advancing the film.

The first-mentioned method has the disadvantage that it requires films specially adapted for the purpose. The utilization of the difference in thickness is relatively difficult, since such differences are only of the order of fractions of a millimeter so that devices based on this principle require a high degree of mechanical precision. In a similar manner, the last-mentioned method of utilizing the difference in pliability of the initial length of the backing paper and of the film strip ceases to be of use in film advancing when films are used that are very pliable or in which the pliability has changed, for example, by atmospheric influences.

The present invention, on the other hand, provides a camera incorporating a scanning device for indicating the beginning of the film and the individual film frames, and provided for this purpose with a spring-loaded feeler pressing against the strip of paper or the film, respectively, and reponding to the different tearing strengths of the paper and of the film. The spring load of the feeler is so selected that, while the paper is torn or cut, the film is not pierced or cut through.

A preferred form of feeler is a toothed star-wheel. This device has the advantage of extreme reliability in operation, since the tearing strengths of the paper and of the film differ quite considerably and do not diminish appreciably even in unfavorable atmospheric conditions or with pliable film material. Furthermore, this device requires only a moderate degree of precision, because the working stroke of the feeler is determined not only by the thicknesses of the paper strip and of the film strip but also by the length of the feeler teeth.

The feeler is operatively associated with a roller operated by advance of the film, which roller actuates the counting mechanism comprising a film frame measuring and film stopping device. Preferably, both feeler and roller are mounted on a spindle supported by two levers spring-loaded independently of each other. The roller is adapted for coupling with the film measuring and stopping device by means of two gears which can be actuated when the feeler is lifted by the passage of the glued joint between backing paper and film strip. After this glued joint has passed, the feeler is maintained in the raised position by a latch means until the camera is once more opened. The latch means is adapted, by reason of a spring-loading arrangement, to impart to the star-wheel an additional stroke or turn whereby the star-wheel is lifted off the film. Furthermore, the latch means can be designed so that it does not respond to very brief lifts of the feeler. In a preferred form, it consists of a cam disc and a latch lever having a projection which is adapted to be displaced by the cam surface of the cam disc.

Return means of known type are provided which return the counting mechanism, i.e., the film frame measuring and film stopping device, to its starting position upon opening of the camera.

About the spindle carrying the roller operated by advance of the film and the feeler, there is provided a film guiding surface for shielding the spindle from the film, said surface having slots through which the roller and the feeler or star-wheel penetrate. Facing the star-wheel, on the camera back, there is provided a film rest, preferably consisting of rollers, having a rectangular recess the size of which may be made adjustable. The teeth of the star-wheel may be pointed or knife-edged.

Having generally described the invention, a more detailed description will be given in connection with the accompanying drawings in which:

Fig. 1 is a perspective view of a film frame measuring and film advancing device incorporated in a photographic camera, Fig. 2 is an axial section through a film scanning device or feeler, Fig. 3 is a radial section through the said feeler, Fig. 4 shows the position of the feeler while scanning the initial film backing paper only, and Fig. 5 shows the position of the feeler while scanning the place where the film strip is glued on to the backing paper.

In Fig. 1 of the drawing, 1 and 2 are details of the camera housing with a frame window 3. A spindle 4, on which are fixed a roller 5, operated by advance of the film, a feeler 6 designed as a star-wheel, and a pinion 7, is supported in angled levers 8, 9 adapted to turn about pivots 10, 11 against loading by tension springs 12, 13. The roller 5 and the feeler 6 penetrate partially through slots in a film guiding surface 36 for shielding the spindle 4 from the film and are so arranged that the margins of the photographic film travel over the said members 5, 6.

When the lever 8 is pivoted—which movement is restricted by an adjustable stop 14—the pinion 7 can be brought into engagement with a gear 15 on a spindle which is supported by means (not illustrated), in the camera housing plate 1 and which gear is connected through gears 16, 17 with an exposure counter dial 18. On an adjacent spindle 19, which is common to the gear 17 and the counter dial 18, there are further rigidly mounted a cam disc 20, against which a compression spring 21 presses a latch 22, and also a mutilated gear 23 having toothed and plain portions. A lever 24, which acts as a film advance latch and is adapted to pivot about a fixed spindle 25, engages the gear 23 in a manner to be hereinafter described. About the counter dial spindle 19 there is loosely mounted a latch 26 having arms 26a, 26b, 26c which respectively engage the levers or latches 8, 22 and 24. A film advancing knob 27 is connected through a spindle 28 with a ratchet gear 29 and through a gearing (not shown in the drawing) to a film spool 30.

As can be seen from Figs. 2 and 3, the partly shown camera back 31 carries opposite the star-wheel 6 a film rest 32, the teeth of the star-wheel 6 penetrating a recess in this rest. To reduce friction during film advance, the film rest 32 can be designed as a pair of spaced adjustable rollers.

The device described above functions in the following manner:

After a photographic film has been inserted in the camera, the camera back (not shown in Fig. 1) is closed and an integral control member (likewise not shown) attached to it is brought up against the end 26d of the latch 26 whereby this latch is urged away from its stop 38, in consequence of which the arms 26a, 26b, 26c are caused to release the levers or latches 8, 22 and 24. While the lever 8, under the action of the spring 12, still prevents the pinion 7 from engaging the gear 15, the spring 21 presses the latch 22 against the cam disc 20 which is in the initial position shown in Fig. 1. A projection 24a of the lever 24 rests against the plain portion of the gear 23.

Simultaneously with the movement of the camera back, while the camera is being closed, the film rest 32 is brought towards the star-wheel 6 (see Fig. 4) and the teeth of the star-wheel 6 pointing in the direction of the film rest 32 thereby pierce the backing paper 33 of the inserted film held between parts 32 and 6. This is readily accomplished since the tension of the spring 12 acting on the lever 8 is greater than the force required to overcome the tearing strength of the film backing paper. The star-wheel 6 and the pinion 7 thus remain in their initial positions.

Thereafter, the manipulation of the film advance knob 27 causes the star-wheel 6 to pierce the initial length of the backing paper 33 during the passage of the whole of this length. During this operation the pinion 7 and the gear 15 remain disengaged, and consequently, the entire film measuring device remains in its initial position until the glued joint between backing paper 33 and film strip 34 reaches the star-wheel 6.

The film strip 34 has a tearing strength so much greater than that of the backing paper 33 that the teeth of the star-wheel 6, under the force of spring 12, are unable to pierce it, and therefore cannot pierce the combination of layers comprising the film strip 34, the paper strip 33, and the glue strip 35 which are superimposed on one another at the glued joint. Since the film rest 32 is supported inelastically, the star-wheel 6, and with it the pinion 7, are lifted against the action of the spring 12 when said glued joint passes underneath. With this movement, the pinion 7 and the gear 15 are caused to engage (see Fig. 5). The roller 5 is now operatively connected with the counting mechanisms consisting of the film measuring and stopping devices during the subsequent advancing of the film. After about one revolution of the roller 5, the cam of the disc 20 has passed the projection of the latch 22 of which the member 22a, under the action of the compression spring 21, now moves in front of the projection 8a of the lever 8 and locks the latter in the position in which the pinion 7 engages with the gear 15. The member 22a is, moreover, enabled under the action of the spring 21, to exert a wedge action on the said projection 8a, which has an inclined surface whereby an additional stroke is given to the lever 8, movement due to this stroke being limited by the adjustable stop 14. In this manner the star-wheel 6 is completely lifted off the film strip during the subsequent advance of the film.

After the film strip 34 has been advanced by one frame, there appears in front of the projection 24a of the lever 24 a gap between two consecutive teeth of the gear 23 in which gap the lever 24 engages, whereby at the same time the film advance device is locked by the pawl 24b engaging in the ratchet gear 29. The disengagement of these parts after the shutter has been released for exposure is brought about by a wedge device provided on the shutter release means (not shown), and which acts on the lever 24, returning it to its starting position in which it is held by a known type of device (not shown in the drawing) until the film is again advanced. The gearing ratio of the gear train 7, 15, 16, 17 is so selected that during the passage of the film strip 34, including the final length of backing paper, the cam disc 20 performs less than one complete revolution so that the lever 8 is kept locked by the latch 22 also during the passage of this backing paper, and the star-wheel 6 neither scans nor pierces the final strip of backing paper. After the whole of the backing paper has passed through, the lever 24 once again locks the film advance device by engaging in a suitably arranged notch on the gear 23.

On the camera being opened, the part 26d of the latch 26 is again released so that the latch 26 returns to its starting position under the action of its associated spring 37, and the latch 22 is lifted by the arms 26b of the latch 26 off the cam disc 20 to release the lever 8 at 8a, whereby the spring 12 causes the pinion 7 to become disengaged from the gear 15. By pivoting the lever 24, the arm 26c unlocks the film advance device, and at the same time a return means (not shown), of known type, causes the whole measuring unit to snap back into the starting position.

To prevent the latch 22, which effects the positive coupling between the gears 7 and 15 from becoming operative even at very short lifts of the star-wheel 6, such as those which can be caused by accidental thickenings or foreign bodies on the initial strip of backing paper, the cam of disc 20 is slightly offset against the projection of the latch 22 in the starting position. With this arrangement, the locking action at 8a becomes operative only when the pinion 7 remains in constant mesh with gear 15 during a certain number of revolutions.

During the scanning action of the star-wheel or feeler 6, the edge of the initial paper strip used as film backing can be either torn or cut. The teeth of the star-wheel 6 can be either pointed (see Fig. 1) or they may have a rectangular or round profile, with knife edges (see Figs. 2 to 5). Alternatively, the teeth of the star-wheel 6 may be blunt so that the backing paper is punched. However, the use of pointed or knife-edged teeth offers the advantage that no detached particles are produced as the paper strip is being scanned.

As many apparently widely different embodiments of this invention may be made without departing from the spirit and scope hereof, it is to be understood that this invention is not limited, except as defined in the appended claims.

What is claimed is:

1. A film position indicating mechanism for a photographic camera including a housing and utilizing roll film which includes a backing paper and a light sensitive film strip which have different tearing strengths, said mechanism comprising a film scanning device, film moving means for passing said film through said camera, movable mounting means supporting said scanning means upon said housing in contact with said film and in a substantially perpendicular path of movement relative to the plane of said film as it passes through said camera, spring means reacting between said scanning means and said housing in a direction to maintain said scanning means in resilient contact with said film, a tearing means including a sharp edge capable of penetrating said backing paper and substantially incapable of penetrating said film strip, supporting means mounting said tearing means in contact with a portion of said film strip at which the character of the penetration of said tearing means into said roll film controls the position of said scanning means in its substantially perpendicular path of movement relative to said plane of said film, said tearing means being constructed and arranged to cause a change in said position of said scanning means when said tearing means is traversed by a joint in said roll film between said backing paper and said film strip, said change being in excess of the change in thickness of said roll film which is present in the vicinity of said joint, and an indicating means operatively connected with said scanning means for providing a signal when an end of said film strip passes said tearing means and changes the character of penetration of said tearing means relative to said roll film.

2. A mechanism as set forth in claim 1 wherein said tearing means is incorporated in said scanning device.

3. A mechanism as set forth in claim 1 wherein said movable mounting means comprises a rotatable spindle, said rotatable spindle being mounted in bearing means, and movable support means mount said bearing means upon said housing to permit the position of said spindle to change in accordance with said position of said scanning means.

4. A mechanism as set forth in claim 1 wherein metering means are disposed in contact with said film as it passes through said camera, a counting mechanism is mounted within said housing for indicating the position of said roll film in said camera and particularly for indicating the beginning of said film strip and the positions of the individual successive film frames incorporated in said film strip, a coupling means operatively connecting said metering means with said counting means, and said scanning means being operatively connected with said coupling means for actuating said coupling means to engage said metering means with said counting mechanism when the position of said scanning means relative to said housing is changed by a change in the character of penetration of said tearing means with respect to said roll film from penetration through said backing strip to non-penetration of said film strip.

5. A mechanism as set forth in claim 4 wherein said scanning means is mounted upon a rotatable spindle, said spindle being mounted in bearings which are movably mounted in said housing, said metering means includes a roller contacting and being rotated by said film, said scanning means includes said tearing device incorporating a star-wheel, said coupling means including a pinion mounted upon said spindle, said counting mechanism including a gear disposed in the plane of said pinion, and said change in character of penetration of said star-wheel from said backing paper to said film strip deflecting said spindle and bearings a sufficient amount to engage said pinion with said gear.

6. A mechanism as set forth in claim 5 wherein said roller is mounted upon said spindle, said roller and said star-wheel are disposed to bear upon opposite margins of said film strip, and a resilient means is independently operatively connected with each of the bearings of said spindle for individually pressing said roller and said star-wheel against said film.

7. A mechanism as set forth in claim 5 wherein locking means are operatively connected with said coupling means for maintaining said pinion engaged with said gear, and control means to permit said counting mechanism to govern the condition of said locking means.

8. A mechanism as set forth in claim 7 wherein said locking means includes a latch, said movable spindle bearing adjacent said pinion being mounted upon a lever, and said latch and said lever being cooperatively constructed and arranged to cause said latch to actuate said lever in a direction to cause said pinion to be maintained in firm engagement with said gear.

9. A mechanism as set forth in claim 7 wherein synchronizing means operatively connects said counting mechanism with said locking means for delaying the actuation of said locking means by said counting mechanism until said counting mechanism has reached a predetermined position.

10. A mechanism as set forth in claim 9 wherein said synchronizing means is comprised of a cam incorporated in said counting mechanism, and said locking means includes a spring-loaded lever which bears against said cam.

11. A mechanism as set forth in claim 7 wherein said movement of said pinion into engagement with said gear by said locking means deflects said spindle a sufficient distance to simultaneously disengage said tearing means from said film strip.

12. A mechanism as set forth in claim 7 wherein actuating means are operatively connected with said locking means, said actuating means projecting from said housing in a position where it can be engaged by a movable portion of said housing, and said actuating means allows said locking means to move ito its inoperative position when said movable portion of said housing is removed from contact with said actuating means.

13. A mechanism as set forth in claim 5 wherein a plate is provided adjacent the path of travel of the surface of said film against which said star-wheel and said roller are in contact, and said plate includes slots through which said star-wheel and said roller extend.

14. A mechanism as set forth in claim 2 wherein a film rest is disposed adjacent the surface of said film opposite said tearing device for holding said film in operative contact with said tearing device, and said film rest includes a recess within which the edge of said tearing device enters when it penetrates said backing paper.

15. A mechanism as set forth in claim 2 wherein said tearing device incorporates a star-wheel having pointed teeth.

16. A mechanism as set forth in claim 2 wherein said tearing device incorporates a star-wheel having knife-edged teeth.

References Cited in the file of this patent

UNITED STATES PATENTS

| | | |
|---|---|---|
| 2,016,611 | Muller | Oct. 8, 1935 |
| 2,548,172 | Pollock | Apr. 10, 1951 |
| 2,691,925 | Sewig | Oct. 19, 1954 |

FOREIGN PATENTS

| | | |
|---|---|---|
| 175,834 | Great Britain | Mar. 2, 1922 |
| 176,557 | Great Britain | Mar. 16, 1922 |
| 877,248 | Germany | Nov. 5, 1953 |